United States Patent
Folden et al.

(10) Patent No.: US 8,768,265 B2
(45) Date of Patent: Jul. 1, 2014

(54) METHOD FOR REDUCING POWER CONSUMPTION IN NODE DEVICES OF A CONDITION MONITORING SYSTEM

(75) Inventors: Dwayne Andrew Folden, Reno, NV (US); Robert Paul Stachow, Jr., Carson City, NV (US); Brandon James Rank, Minden, NV (US); Benjamin Wayne Willis, Minden, NV (US); Trevor Shaun Kavanaugh, Minden, NV (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 13/306,437

(22) Filed: Nov. 29, 2011

(65) Prior Publication Data

US 2013/0137378 A1 May 30, 2013

(51) Int. Cl.
*H04B 1/00* (2006.01)
*H04B 7/00* (2006.01)

(52) U.S. Cl.
USPC ......... 455/69; 455/68; 455/67.11; 455/67.13; 455/522; 455/574

(58) Field of Classification Search
USPC .............. 455/67.11, 522, 574, 67.13, 68, 69, 455/343.1, 343.2
See application file for complete search history.

(56) References Cited

U.S. PATENT DOCUMENTS

| 4,613,990 A * | 9/1986 | Halpern ..................... 455/522 |
| 5,710,981 A | 1/1998 | Kim et al. |
| 7,756,678 B2 * | 7/2010 | Bonissone et al. ............ 702/182 |
| 8,310,103 B2 * | 11/2012 | Fischer .......................... 307/85 |

\* cited by examiner

*Primary Examiner* — Tuan A Tran
(74) *Attorney, Agent, or Firm* — Hiscock & Barclay LLP

(57) ABSTRACT

This disclosure describes examples of condition monitoring systems with node devices that can adjust the power level of a radio. Embodiments of the node device can dynamically vary the power level for the radio in response to communication with other node devices. In one example, the node devices measure the strength of a signal received from the other node devices. The node devices can, in response to this value, vary the power level of the radio to optimize power consumption and extend the battery life for the node device.

20 Claims, 4 Drawing Sheets

METHOD FOR REDUCING POWER CONSUMPTION IN NODE DEVICES OF A CONDITION MONITORING SYSTEM

BACKGROUND OF THE INVENTION

The subject matter disclosed herein relates to condition monitoring systems and, more particularly, to embodiments of methods for reducing power consumption in node devices that form a mesh network in condition monitoring systems.

There are billions of dollars invested in fixed-plant equipment performing vital and time-critical functions supporting industrial and infrastructure activities. It is essential that degradation in these equipment be expeditiously identified in order to isolate or repair the ailing equipment before they fail and severely impact the efficiency of the system of which they are a part or, even more seriously, cause physical damage that is spread significantly beyond the failed equipment. Accordingly, there is a growing need for condition monitoring systems with improved maintenance agility and responsiveness, increase operational availability, and reduce life-cycle total ownership costs.

The discussion above is merely provided for general background information and is not intended to be used as an aid in determining the scope of the claimed subject matter.

BRIEF DESCRIPTION OF THE INVENTION

This disclosure describes embodiments of a condition monitoring system and methods for operating components of the condition monitoring system, wherein an advantage of the disclosed methods is to improve battery life for node devices that form a mesh network in the condition monitoring system.

In one embodiment, the disclosure describes a condition monitoring system for monitoring operation of a peripheral asset. The condition monitoring system can include a first node device with a radio having a radio power level that is adjustable. The first node device can also have a processor, a memory coupled to the processor, and one or more executable instructions stored on the memory and configured to be executed by the processor to adjust the radio power level for the radio. The executable instructions can comprise instructions to receiving a signal from a second node device via the radio and to measuring a signal strength for the received signal. The instructions can also include instructions to adjust the radio power level in accordance with a pre-determined criteria relating the signal strength to a value for the radio power level that reduces power consumption in the first node device.

In another embodiment, the disclosure describes a method for reducing power consumption in node devices of a condition monitoring system. The method can be executed at a first node device comprising a radio, a processor, and memory. The method can include steps for receiving a signal from a second node device via the radio and for measuring a signal strength for the received signal. The method can also includes steps for adjusting the radio power level in accordance with a pre-determined criteria relating the signal strength to a value for the radio power level that reduces power consumption in the first node device.

In yet another embodiment, the disclosure provides a method to prolong battery life in node devices of a condition monitoring system. The method can be executed at a first node device comprising a radio, a processor, and memory. The method can include steps for transmitting a signal to a second node device and for receiving a signal from the second node device in response to the transmitted signal. The method can also includes steps for measuring a signal strength for the received signal, comparing the signal strength to a threshold, and for setting a value of the radio power level so the signal strength falls between an upper boundary and a lower boundary defined by the threshold.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
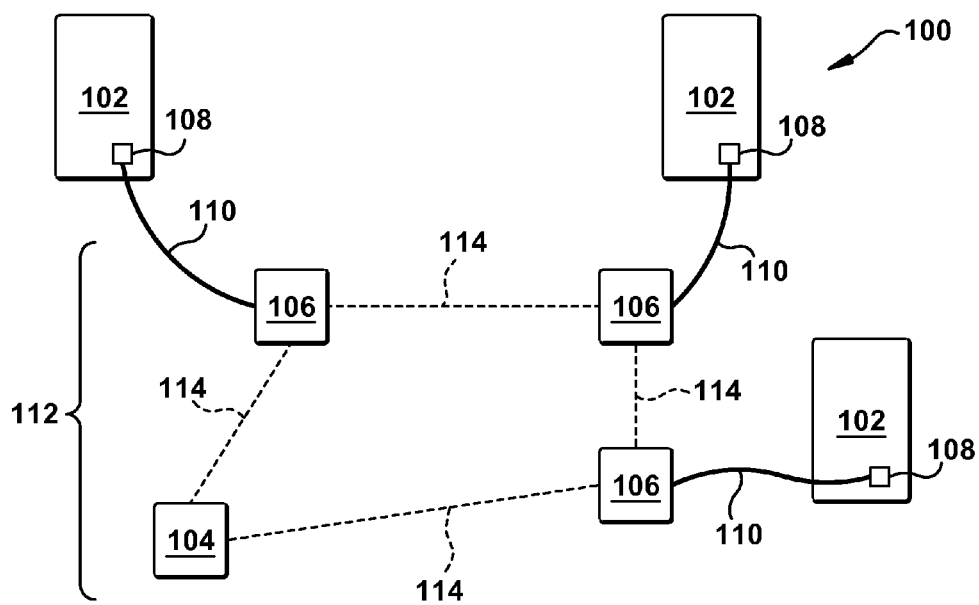
FIG. 1 depicts a schematic diagram of an exemplary condition monitoring system that uses a mesh network.

FIG. 1 illustrates an exemplary embodiment of a condition monitoring system 100 (also a "system 100") that monitors operation of one or more peripheral or "balance-of-plan" assets 102. The peripheral assets 102 support operation of larger and/or more complex machinery, e.g., gas turbines. Examples of the peripheral assets 102 include pumps and motors that provide working fluids (e.g., liquid, gas, etc.) to the machinery. As shown in FIG. 1, the system 100 also includes a gateway device 104 and a plurality of node devices 106. The node devices 106 have one or more sensors 108 that measure parameters (e.g., vibration, flow, temperature, etc.) local to the peripheral assets 102. A cable 110 couples the sensors 108 to the node devices 106.

Collectively, the gateway 104 and the node devices 106 form a mesh network 112 with signal paths 114 over which the gateway 104 and the node devices 106 exchange signals with one another. The signal paths 114 represent radio or wireless communication paths that can utilize a variety of wireless protocols and standards (e.g., ZigBee®, WirelessHART™, 802.15.4™, etc.). The node devices 106 use the signals to convey data to one another. This data can define the relative position of one of the node devices 106 to another and/or the distance that separates one of the node devices 106 from another. The signals can also convey other information that relates to performance of the peripheral assets 102. As discussed more below, communication among the node devices 106 can help to reduce power consumption at each of the node devices 106 in the mesh network 108.

Figure 2:
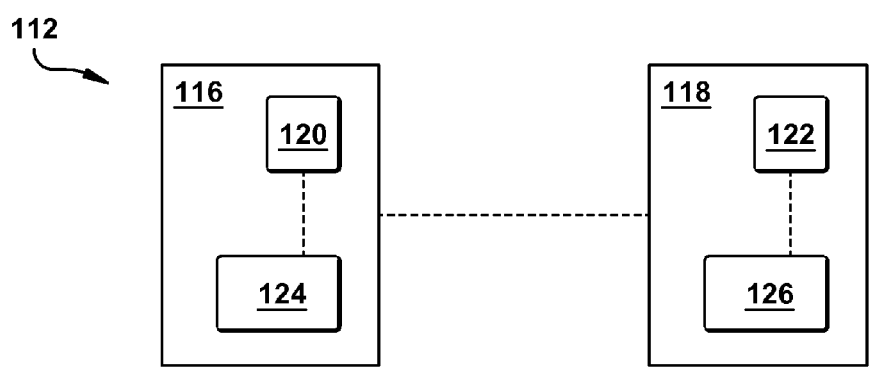
FIG. 2 depicts a schematic diagram of a portion of an exemplary mesh network such as the mesh network of FIG. 1.

FIG. 2 focuses on a portion of the mesh network 112 and, more particularly, on communication that can occur between a first node device 116 and a second node device 118. In the present example, the first node device 116 and the second node device 118 are outfit with a radio (e.g., a first radio 120 and a second radio 122) and a power supply (e.g., a first power supply 124 and a second power supply 126). As discussed more below, the first node device 116 can dynamically set the power level for the first radio 120 (also "radio power level") in response to communication that occurs with the second node devices 118, and vice versa. The first node device 116 can, for example, measure the strength of a signal received from the second node device 118. In response to the signal strength of the received signal, the first node device 116 can adjust the radio power level until the first node device 116 uses the least amount of power necessary to communicate with the second node device 118. This feature can help prolong the lifespan of the first power supply 124 and the second power supply 126. Moreover, because the first node device 116 and the second node device 118 are often found in and around hazardous areas, reducing power consumption can prevent injury by reducing the need to change the power supply or provide other maintenance or attention that may place workers in harm's way.

Figure 3:
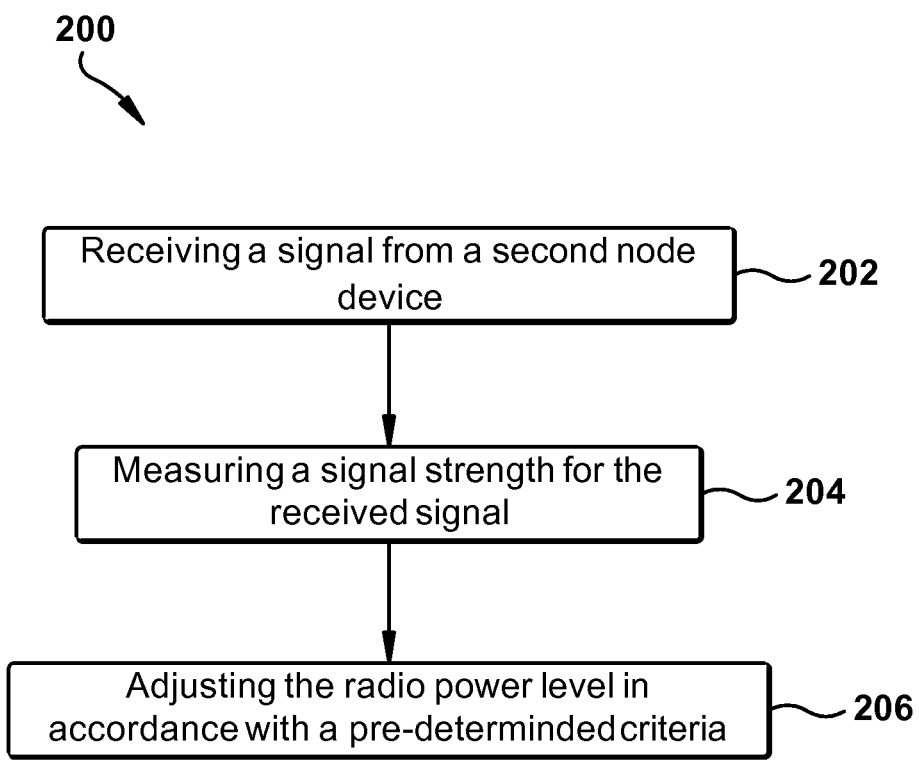
FIG. 3 depicts a flow diagram of an exemplary method to adjust the power level of a node device in a mesh network such as the mesh network in FIG. 1.

FIG. 3 shows a flow diagram of an exemplary method 200 to adjust the power level of the first radio 120. The method 200 includes, at step 202, receiving a signal from the second node device 118 and, at step 204, measuring a signal strength for the received signal. The method 200 also includes, at step 206, adjusting the radio power level in accordance with a pre-determined criteria, which relates the signal strength to a value for the radio power level that reduces power consumption in the first node device. The first node device 116 and the second node device 118 can store these steps (e.g., the steps 202, 204, and 206) as executable instructions (e.g., software and/or firmware), which components (e.g., processors) of the first node device 116 and the second node device 118 can execute.

For purposes of the present example, reference will be made to only two node devices (e.g., first node device 116 and second node device 118). The discussion that follows, however, can apply to any combination of the node devices 106 in the mesh network 112. In one example, the node devices 106 can collectively adjust the value of the radio power level and continue to monitor and adjust the signal strength, e.g., via changes in the value of the radio power level. This feature has particular application when the first node device 116 and the second node device 118 change position relative to one another. Movement toward one another can, for example, increase the signal strength, thereby permitting adjustments of the radio power level to lower levels. On the other hand, movement away from one another may require that the radio power level increase to higher levels because the first node device 116 and the second node device 118 lose communication with one another.

The received signal (e.g., at step 202) can include data, e.g., data that identifies the second node device 118 to the first node device 116. This data may include, for example, a serial number or other identification information. The threshold (e.g., at step 204) defines a value for the signal strength. This value may correspond to settings for the first node device 116 that optimize the power consumption of the first radio 120. In one embodiment, the step of adjusting the value of the radio power level (e.g., at step 206) changes the signal strength of a signal that the first node device 116 broadcasts.

The pre-determined criteria guides the relative change that the first node device 116 applies to the value of the radio power level. For example, the pre-determined criteria may require that the signal strength is greater than, less than, and/or equal to the threshold. The first node device 116 can apply an incremental value, which increases and/or decreases the radio power level until the signal strength of the received signal satisfies the pre-determined criteria. The incremental value may be the same and/or different depending on whether the first node device 116 needs to increase or decrease the radio power level. For example, the first node device 116 may use smaller incremental values (e.g., ±1 dB) to increase the radio power level closer to the minimum required radio power level. The first node device 116 may use relatively larger incremental values (e.g., ±5 dB) to reduce the radio power level may facilitate execution of the method 200 more quickly.

Figure 4:
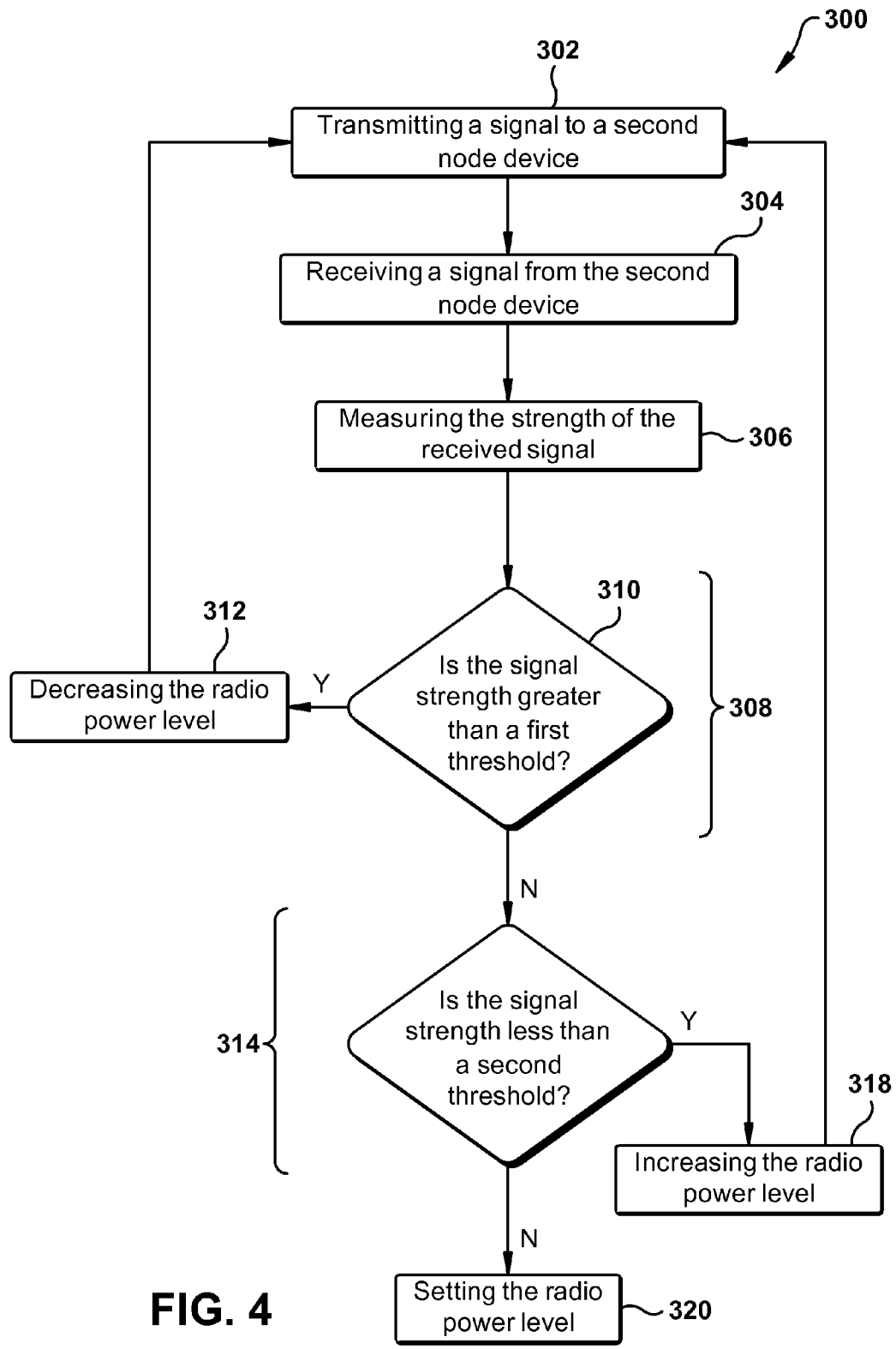
FIG. 4 depicts a flow diagram of another exemplary method to adjust the power level of a node device in a mesh network such as the mesh network of FIG. 1.

FIG. 4 illustrates another exemplary embodiment of a method 300 to adjust the radio power level in the first node device 116 using communication with the second node device 118. The method 300 includes, at step 302, transmitting a signal to the second node device 118 and, at step 304, receiving a signal from the second node device 118 in response to the transmitted signal. The method also includes, at step 306, measuring the strength of the received signal and, at step 308, determining whether the received signal strength is different from a first threshold. The step of measuring can, in one illustrative embodiment, include a step for measuring a received signal strength indicator (RSSI), which artisans skilled in the relevant electrical arts will recognize.

In one example, the method 300 determines, at step 310, whether the received signal strength is greater than the first threshold. If affirmative, the method 300 continues, at step 312, decreasing the radio power level. The method 300 can also continue to step 302 to transmit the signal at the lower or reduced radio power level. On the other hand, if the received signal strength is not greater than the first threshold, and in one example is less than the first threshold, the method 300 continues, at step 314, determining whether the received signal strength is different from a second threshold. In one example, the method 300 determines, at step 316, whether the received signal strength is less than the second threshold. If affirmative, then the method 300 continues, at step 318, increasing the radio power level. The method 300 can also continue to step 302 to transmit the signal at the higher or increased radio power level. If the received signal strength is not less than, and in one example is greater than the second threshold, then the method 300 continues, at step 320, to setting the value of the radio power level, which can cause the signal strength to fall between the first threshold and the second threshold.

In one illustrative method, the first threshold and the second threshold are set to the same value. However, it is also appropriate for the first threshold and the second threshold to have values that are different from one another. For example, the first threshold and the second threshold may define, respectively, an upper boundary and a lower boundary. Values of the signal strength between these two boundaries may provide adequate power savings and, also, help to speed resolution of the method 300 to identify the radio power level that provides adequate power consumption.

Figure 5:
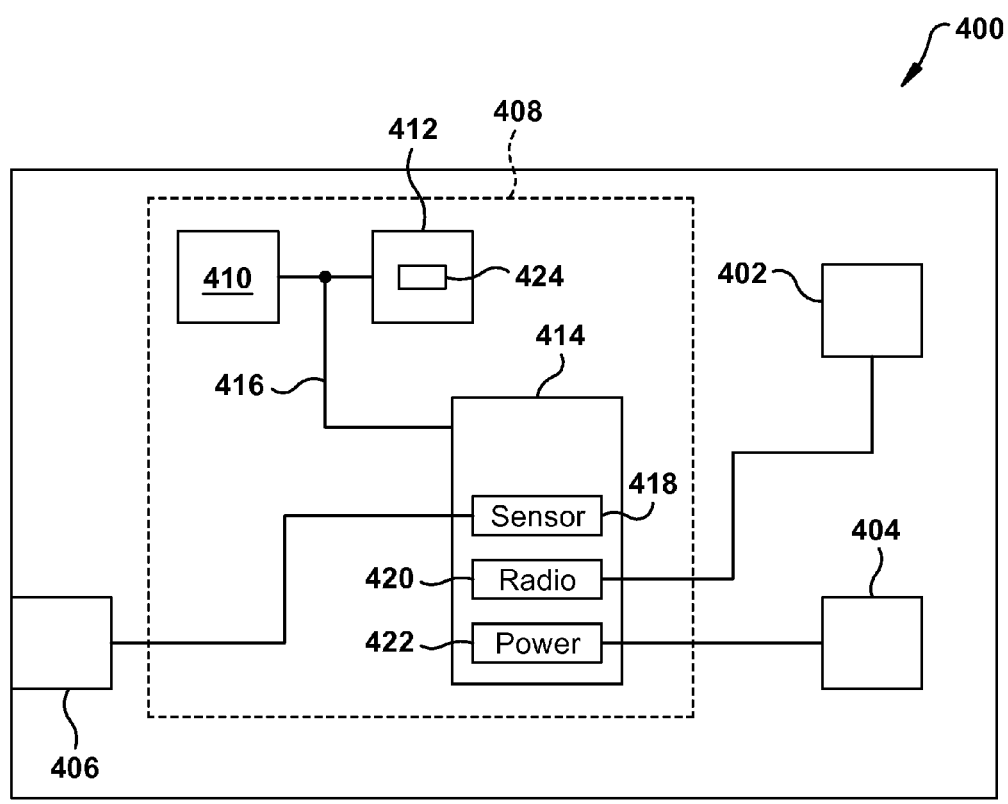
FIG. 5 depicts a wiring schematic for an exemplary node device for use in a mesh network such as the mesh network of FIG. 1.

FIG. 5 illustrates a high-level wiring schematic of an exemplary node device 400. Generally a variety of configurations can implement the concepts of the present disclosure. The example of FIG. 4 provides a schematic diagram of one exemplary structure. In the present example, the node 400 includes radio 402, a power supply 404, and a sensor port 406. The node 400 also includes a control circuit 408 with a processor 410, a memory 412, and a component circuit 414, all connected by a bus 416. The component circuit 414 can include a sensor driver circuit 418, a radio driver circuit 420, and a power supply driver circuit 422. Also shown in FIG. 4, the memory 412 can store one or more computer programs or executable instructions in the form of, for example, instructions 424 for adjusting a radio power setting. Examples of these instructions are provided in connection with FIGS. 2 and 3 discussed above. The steps of the methods 200 and 300 can be provided as executable instructions, which the components of the control circuit 408 and/or the node 400 can execute to implement and, ultimately, generate the signals disclosed herein.

Although shown as individual units, variations of construction can combine one or more components of the control circuit 408, e.g., with the radio 402. In one example, the processor 410 is a central processing unit (CPU) such as an ASIC and/or an FPGA. The processor 410 can also include state machine circuitry or other suitable components capable of receiving inputs from the component circuitry 414, radio 402, directly from the sensor port 406, and/or other components. The memory 412 comprises volatile and non-volatile memory and can be used for storage of software (or firmware) instructions and configuration settings. In some embodiments, the processor 410, the memory 412, and the circuitry 408 can be contained in a single integrated circuit (IC) or other component. As another example, the processor 410 can include internal program memory such as RAM and/or ROM. Similarly, any one or more of functions of these components can be distributed across additional components (e.g., multiple processors or other components).

In view of the foregoing, embodiments of the systems and devices are configured to communicate with one another and to adjust the power level of the radio or other communication devices found therein. A technical effect is to reduce power consumption of the radio and, ultimately, prolong the life of the power supply.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A condition monitoring system for monitoring operation of a peripheral asset, said condition monitoring system comprising:
a first node device comprising a radio having a radio power level that is adjustable, a processor, a memory coupled to the processor, and one or more executable instructions stored on the memory and configured to be executed by the processor to adjust the radio power level for the radio, the executable instructions comprising instructions for,
receiving a first signal from a second node device via the radio;
measuring a signal strength for the first signal; and
adjusting the radio power level in accordance with a pre-determined criteria relating the signal strength of the first signal to a value for the radio power level that requires the least amount of power necessary for the first node device to communicate with the second node device.

2. The condition monitoring system of claim 1, wherein the executable instructions further comprise instructions for transmitting a second signal to the second node device to stimulate the first signal from the second node device.

3. The condition monitoring device of claim 2, wherein the radio power level causes the second signal from the first node device and the first signal from the second node device to have the same signal strength as measured at, respectively, the second node device and the first node device.

4. The condition monitoring system of claim 1, wherein the executable instructions further comprise instructions for comparing the signal strength to a threshold, wherein the pre-determined criteria defines an incremental value to adjust the value of the radio power level to change the signal strength relative to the threshold.

5. The condition monitoring system of claim 4, wherein the incremental value reduces the signal strength.

6. The condition monitoring system of claim 4, wherein the incremental value increases the signal strength.

7. The condition monitoring system of claim 4, wherein the incremental value comprises a first incremental value and a second incremental value that change the value of the radio power level by different amounts.

8. The condition monitoring system of claim 4, wherein the threshold defines an upper boundary and a lower boundary for the signal strength, wherein the executable instructions at the first node device further comprise instructions for
comparing the signal strength to the upper boundary and the lower boundary of the threshold,
setting the value of the radio power level at the first node device, and
transmitting a second signal to stimulate the first signal from the second node device,
wherein the second node device comprises a radio having a radio power level that is adjustable, a processor, a memory coupled to the processor, and one or more executable instructions stored on the memory and configured to be executed by the processor to adjust the radio power level for the radio, the executable instructions comprising instructions for setting the value of the radio power level at the second node device in response to the second signal from the first node device so the signal strength of the first signal received from the second node device at the first node device falls between the upper boundary and the lower boundary.

9. The condition monitoring system of claim 1, wherein the signal strength is a received signal strength indicator.

10. The condition monitoring system of claim 1, wherein the first node device and the second node device couple with, respectively, a first sensor and a second sensor, and wherein the first sensor and the second sensor are configured to monitor performance of the peripheral asset.

11. A method for reducing power consumption in node devices of a condition monitoring system, said method comprising:
at a mesh network comprising a first node device and a second node device, each comprising a radio, a processor, and memory:
receiving a first signal from the second node device via the radio at the first node device;
measuring a signal strength for the first signal at the first node device; and
adjusting the radio power level at the first node device in accordance with a pre-determined criteria relating the signal strength for the first signal to a value for the radio power level at the first node device that requires the least amount of power necessary for the first node device to communicate with the second node device.

12. The method of claim 11, further comprising:
comparing the signal strength of the first signal to an upper boundary and an lower boundary of a threshold for the pre-determined criteria,
setting the value of the radio power level at the first node device;
transmitting a second signal to the second node device; and
adjusting the radio power level at the second node device in accordance with a pre-determined criteria relating the signal strength for the second signal to a value for the radio power level at the second node device so the signal strength falls between an upper boundary and a lower boundary defined by the threshold.

13. The method of claim 11, further comprising transmitting a signal to the second node device, wherein the signal strength of the received signal is the same as the signal strength of the transmitted signal as measured at, respectively, the first node device and the second node device.

14. The method of claim 11, further comprising comparing the signal strength to a threshold, wherein the pre-determined criteria defines an incremental value to adjust the value of the radio power level to change the signal strength relative to the threshold.

15. A method to prolong battery life in node devices of a condition monitoring system, said method comprising:
at a first node device comprising a radio, a processor, and memory:
transmitting a signal to a second node device;
receiving a signal from the second node device in response to the transmitted signal;
measuring a signal strength for the received signal;
comparing the signal strength to a threshold; and
setting a value of the radio power level so the signal strength for the received signal falls between an upper boundary and a lower boundary defined by the threshold,
wherein the value of the radio power level requires the least amount of power necessary for the first node device to communicate with the second node device.

16. The method of claim 15, wherein the signal strength is a received signal strength indicator.

17. The method of claim 15, wherein the transmitted signal and the received signal have the same signal strength as measured at, respectively, the second node device and the first node device.

18. The method of claim 15, further comprising increasing and decreasing the value of the radio power level by an incremental value.

19. The method of claim 18, wherein the incremental value includes a first incremental value for increasing the value of the radio power level and a second incremental value for decreasing the value of the radio power level.

20. The method of claim 15, wherein a pre-determined criteria relates the signal strength to the value for the radio power level to reduce power consumption in the first node device.

* * * * *